United States Patent Office 3,149,094
Patented Sept. 15, 1964

3,149,094
POLYAMIDES FROM BIS-(CARBOXYPHENYL)-PYRIDINE
Ellis K. Fields, Chicago, Ill., assignor to Standard Oil Company, Chicago, Ill., a corporation of Indiana
No Drawing. Filed Feb. 28, 1961, Ser. No. 92,131
4 Claims. (Cl. 260—78)

This invention relates to a new class of polyamides and more particularly pertains to polyamides derived from the reaction of a polyamine and a pyridine polybenzoic acid as well as polyamides derived from the reaction of a polyamine with a pyridine polybenzoic acid with a second dicarboxylic acid.

The new class of polyamides with which this invention is concerned can be prepared by reacting a pyridine polybenzoic acid having the structural formula:

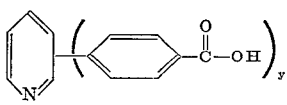

wherein $y$ is an integer of from 2 to 3, with a polyamine such as 1,6-hexane diamine, 1,4-diamino butane, 1,5-diamino pentane, p-phenylene diamine, and 2,6-diamino pyridine. In general, these amines have the formula $H_2N$—R—$NH_2$ wherein R is a divalent organic radical of from 2 to 6 carbon atoms. The polyamine can also be reacted with the poly acid chloride of the pyridine polybenzoic acid. The ratio of polyamine to pyridine polybenzoic acid may be varied within the range of from 1 to 50 equivalents, preferably from 1–20 equivalents, of $NH_2$ per equivalent of COOH in the pyridine polybenzoic acid.

Co-polyamides can also be obtained by reacting a polyamine, a pyridine polybenzoic acid, and a dicarboxylic acid. Their dicarboxylic acid content can be varied from 0.1 to 75% by weight based on the weight of pyridine polybenzoic acid employed. As the co-dicarboxylic acid reactant for such mixed polyamides there can be employed succinic acid, glutaric acid, adipic acid, pimelic acid, terephthalic acid, isophthalic acid, benzophenone dicarboxylic acid, diphenyl sulfone dicarboxylic acid and the like.

The homo-polyamides and the co-polyamides of this invention are, in general, slightly soluble in pyridine and soluble in dimethylformamide, and can be readily dyed to a product whose color is not removed by water, alcohols, ketones or hydrocarbon solvents. The dyeability of the polyamides of this invention and the permanence of color of the dyed polyamide is in sharp contrast to that of the homo-polyamide obtained from adipoyl chloride and 1,6-hexanediamine, as will be hereinafter demonstrated.

The preferred pyridine polybenzoic acids to be used in preparing the polyamides of this invention are 2,6-carboxyphenyl pyridine, 4-phenyl - 2,6 - dicarboxyphenyl pyridine and 2,4,6-tricarboxyphenyl pyridine. The preparation of these preferred pyridine polybenzoic acids is described in copending application S.N. 92,132, filed February 28, 1961.

The polyamides of this invention can be employed as surface coatings, either as clear films or as pigmented films. For example, a dimethylformamide solution of a homopolyamide or co-polyamide of this invention can be applied to wood, metal, glass, woven fabrics and wire to provide on the surfaces thereof a clear, exceedingly tough, tightly adhering protective surface film. By adding finely divided pigmented material to said dimethylformamide solutions of the polyamides of this invention, surface coating films of various colors may be obtained. Cast films of the polyamides of this invention may also be prepared by depositing a uniformly thin dimethylformamide solution of the polyamide on a lubricated, polished metal or glass plate. Coloring of the surface coating film or cast film may be accomplished by dyeing the polymer. The polyamides of this invention may be spun from a melt thereof or a dimethylformamide solution thereof, the resulting filaments stretched to provide mono-filaments or staple filaments from which yarns and threads can be prepared.

The preparation and characterization of representative polyamides of this invention are described in the following illustrative examples wherein the polyamides are formed by the interfacial polycondensation technique for producing high molecular weight products.

Example I 27.65 g. (0.07 mole) 4-phenyl-2,6-di-p-carboxyphenyl pyridine is refluxed in 300 ml. of dry chloroform with 15.75 ml. (0.217 mole) thionyl chloride. The chloroform and excess thionyl chloride are distilled off in vacuo, the residue taken up in dry $HCCl_3$, filtered from a little insoluble material, and made up to a total volume of 350 ml. in $HCCl_3$.

A solution of 4.15 g. (0.0275 mole) 72% aqueous 1,6-hexanediamine and 6 g. (0.15 mole) NaH in 200 ml. water is stirred rapidly in a Waring Blendor. To it is added a solution of 4.28 g. (0.01 mole) 4-phenyl-2,6-pyridine di-p-benzoylchloride, in 150 ml. $HCCl_3$. The polyamide is filtered, washed thoroughly with water and methanol and dried. It weighs 2.4 g. *Nitrogen analysis.*—Calculated for:

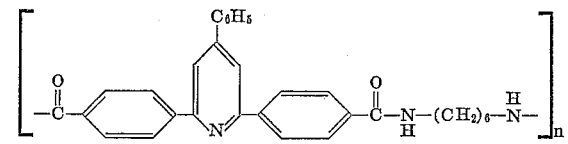

($n$ is in the range of 100–2000). $(C_{30}H_{27}N_3O_2)_n$: N, 9.11. Found: N, 9.31.

This novel polyamide melts at 285–310° C.; it is slightly soluble in pyridine and soluble in dimethylformamide. The solution in dimethylformamide dries to a clear, very tough, tightly-adhering film on a glass plate.

Example II

A co-polyamide is prepared with adipoyl chloride. To a rapidly stirred solution of 4.15 g. (0.0275 mole) 72% aqueous 1,6-hexanediamine and 6 g. (0.15 mole) NaOH in 200 ml. water in a Waring Blendor is added a solution of 3.67 g. (0.02 mole) adipoyl chloride and 1.07 g. (0.0025 mole) 4-phenyl-2,6-pyridine di-p-benzoyl chloride in 150 ml. chloroform. The copolymer is filtered, washed with water and methanol and dried. It weighs 2 g. *Nitrogen analysis.*—Calculated for copolyamide: N, 12.38. Found: N, 11.31. This copolyamide melts at 240–250° C. and is slightly soluble in dimethyl formamide.

To demonstrate the dyeability of polymers containing the novel pyridine benzoic acids, the copolyamide of Example II is soaked for 5 minutes in a 1% solution of Congo red in acidified ethanol. It is then collected on a filter and washed thoroughly with ethanol till the washings are colorless. The polymer is dyed a bluish purple. The color is not removed by water, methanol, acetone, or xylene.

In contrast, a homo-polyamide is prepared from adipoyl chloride and 1,6-hexanediamine and is treated with Congo red in the identical fashion. It becomes white after being washed with ethanol, and retains none of the dye.

What is claimed is:

1. A linear polycarbonamide whose molecule consists essentially of the unit

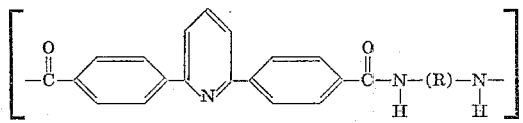

wherein R is a divalent organic radical selected from the class consisting of divalent hydrocarbon radicals containing 2 to 6 carbon atoms and the divalent pyridylene radical, and said polyamide is soluble in dimethylformamide.

2. The liner polycarbonamide whose molecule consists essentially of the unit

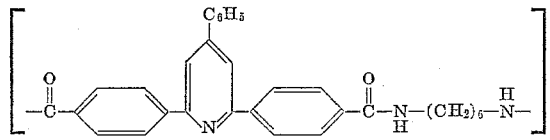

and is soluble in dimethylformamide.

3. The linear polycarbonamide obtained by reacting 1,6-diaminohexane, adipoyl chloride and 4-phenyl-2,6-pyridine di-p-benzoyl chloride in about equimolar proportions, said polyamide melting at 240–250° C., is characterized by being soluble in dimethylformamide and dyeable with Congo red in acidified ethanol to a blue-purple whose color is not removed by water, methanol, acetone or xylene.

4. A linear polycarbonamide obtained by reacting a diamine of the formula $H_2N-R-NH_2$, wherein R is a divalent organic radical containing 2 to 6 carbon atoms selected from the class consisting of divalent hydrocarbon radicals and the divalent pyridylene radical with a pyridine polybenzoic acid containing from 2 to 3 monocarboxyphenyl groups in an amount in the range of 1 to 50 equivalents of $NH_2$ per equivalent of COOH group and from 0 to 75 weight percent of a second different dicarboxylic acid based on the pyridine polybenzoic acid, said polyamide being characterized by being soluble in dimethylformamide and dyeable with Congo red in acidified ethanol to a blue-purple whose color is not removed by water, methanol, acetone or xylene.

References Cited in the file of this patent
UNITED STATES PATENTS
2,625,536    Kirby _____ Jan. 13, 1953
OTHER REFERENCES
Chem. Abstracts, volume 52, 1958, pages 14, 222d.

UNITED STATES PATENT OFFICE
CERTIFICATE OF CORRECTION

Patent No. 3,149,094　　　　　　　　　　　　September 15, 1964

Ellis K. Fields

It is hereby certified that error appears in the above numbered patent requiring correction and that the said Letters Patent should read as corrected below.

Column 2, line 26, for "NaH" read -- NaOH --; column 3, line 13, for "liner" read -- linear --.

Signed and sealed this 5th day of January 1965.

(SEAL)
Attest:

ERNEST W. SWIDER　　　　　　　　　　　　EDWARD J. BRENNER
Attesting Officer　　　　　　　　　　　　Commissioner of Patents